(12) United States Patent
Matsuo et al.

(10) Patent No.: US 10,704,491 B2
(45) Date of Patent: Jul. 7, 2020

(54) PISTON COOLING GALLERY SHAPING TO REDUCE PISTON TEMPERATURE

(71) Applicant: Tenneco Inc., Southfield, MI (US)

(72) Inventors: Eduardo Matsuo, Ann Arbor, MI (US); Gregory Rudzik, Waterford, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 16/157,791

(22) Filed: Oct. 11, 2018

(65) Prior Publication Data

US 2020/0116102 A1    Apr. 16, 2020

(51) Int. Cl.
| | |
|---|---|
| F02F 3/20 | (2006.01) |
| F02F 3/26 | (2006.01) |
| B21K 1/18 | (2006.01) |
| B23K 20/12 | (2006.01) |
| F02F 3/00 | (2006.01) |

(52) U.S. Cl.
CPC ............... *F02F 3/20* (2013.01); *B21K 1/185* (2013.01); *B23K 20/129* (2013.01); *F02F 3/0092* (2013.01); *F02F 3/26* (2013.01); *F02F 2200/06* (2013.01)

(58) Field of Classification Search
CPC ...... F02F 3/003; F02F 2003/0061; F02F 3/18; F02F 3/16
See application file for complete search history.

(56) References Cited

U.S. PATENT DOCUMENTS

| | | | |
|---|---|---|---|
| 2,860,614 A | 11/1958 | Burnand | |
| 3,070,079 A | 12/1962 | Seifert | |
| 4,363,293 A | 12/1982 | Munoz et al. | |
| 5,086,736 A | 2/1992 | Wiemann | |
| 6,279,455 B1 | 8/2001 | Kruse | |
| 6,772,846 B1 | 8/2004 | Scharp | |
| 7,281,466 B1 | 10/2007 | Wilksch et al. | |
| 9,163,580 B2 * | 10/2015 | Edel | F02F 3/00 |
| 9,243,709 B2 | 1/2016 | Lapp et al. | |
| 9,670,871 B2 | 6/2017 | Ottliczky et al. | |
| 2014/0123930 A1 * | 5/2014 | Lineton | F02F 3/16 |
| | | | 123/193.6 |
| 2014/0260960 A1 * | 9/2014 | Lapp | F16J 1/005 |
| | | | 92/186 |
| 2015/0184613 A1 | 7/2015 | Linke | |
| 2016/0102596 A1 * | 4/2016 | Vaden | F02B 23/0678 |
| | | | 123/41.35 |
| 2016/0131075 A1 | 5/2016 | Lapp et al. | |
| 2016/0222911 A1 * | 8/2016 | Salenbien | F02F 3/003 |
| 2017/0184052 A1 * | 6/2017 | Lineton | B32B 27/42 |

* cited by examiner

*Primary Examiner* — Long T Tran
(74) *Attorney, Agent, or Firm* — Robert L. Stearns; Dickinson Wright, PLLC

(57) ABSTRACT

A piston for an internal combustion engine is provided. The piston includes a lower part joined to an upper part, for example by friction welding with inertia. The upper part presents a combustion surface and an undercrown surface. The piston also includes a cooling gallery surface provided by the upper part and the lower part. The cooling gallery surface surrounds a volume of space for containing a cooling media. The piston can include serrations in the cooling gallery surface and/or undercrown surface to increase surface area and thus reduce the temperature of the piston. The piston can also include shaped weld curls, instead of or in addition to the serrations, which also increase surface area and reduce the temperature of the piston.

19 Claims, 4 Drawing Sheets

PISTON COOLING GALLERY SHAPING TO REDUCE PISTON TEMPERATURE

BACKGROUND OF THE INVENTION

1. Field of the Invention

This invention relates generally to pistons for internal combustion engines, and methods for manufacturing the pistons.

2. Related Art

Pistons used in internal combustion engines, such as heavy duty diesel pistons, are exposed to extremely high temperatures during operation, especially along the crown of the piston. Therefore, to moderate the temperature, some pistons are designed with an open cooling gallery in the center of the piston along an undercrown surface, and cooling oil is sprayed into the cooling gallery as the piston reciprocates along a cylinder bore of the engine. The oil flows along the inner surface of the crown and dissipates heat away from the crown. However, to control the piston temperature during operation, a high flow of oil must be maintained constantly. In addition, the oil degrades over time due to the high temperature of the internal combustion engine, and the oil must be changed periodically to maintain engine life. Furthermore, when the cooling gallery temperature exceeds 350° C., the oil tends to burn at a higher rate, referred to as oil coking, and adhere to the surface of the gallery.

Another option is to design the piston with a sealed cooling gallery containing cooling oil or another coolant to control the piston temperature. U.S. Pat. No. 9,127,619 discloses an example of a piston including a sealed cooling gallery partially filled with a liquid containing metal particles having a high thermal conductivity. The liquid carries the metal particles throughout the cooling gallery as the piston reciprocates in the internal combustion engine, and the metal particles remove heat away from the crown. The metal particles can re-distribute the heat flow, and thus reduce carbon deposits, coking, and oil degradation along the crown.

However, piston and engine manufacturers continuously strive to develop new and improved methods to better maintain heat in the combustion chamber, reduce the operating temperature of the piston, and thus further improve engine brake thermal efficiency. In addition, manufacturers of steel pistons for heavy duty diesel engines are constantly challenged to design the pistons such that the maximum temperature at a bowl rim and/or bowl apex of the crown, the maximum temperature at the closed cooling gallery, and/or the maximum temperature at the undercrown surfaces are within an acceptable range, for example to avoid bowl rim oxidation or erosion, coked oil deposits along the cooling gallery and/or undercrown surfaces, and to reduce oil degradation.

SUMMARY

One aspect of the invention comprises a piston for an internal combustion engine. The piston includes a body formed of a metal material. The body presents a combustion surface and an undercrown surface, and a cooling gallery surface surrounding a volume of space which extends circumferentially around the undercrown surface. The body also includes a plurality of serrations formed in the cooling gallery surface and/or the undercrown surface, each serration including a base surface which presents a concave shape. The base surface is 1 to 3 mm deep relative to the cooling gallery surface and/or the undercrown surface.

Another aspect of the invention provides a method of manufacturing a piston for an internal combustion engine. The method comprises the steps of: providing a body formed of a metal material, the body including an upper part presenting a combustion surface and an undercrown surface, the body including a cooling gallery surface surrounding a volume of space which extends around the undercrown surface. The method further includes forming a plurality of serrations in the cooling gallery surface and/or the undercrown surface, each serration including a base surface which presents a concave shape, and the base surface is 1 to 3 mm deep relative to the cooling gallery surface and/or the undercrown surface.

Another aspect of the invention provides a piston for an internal combustion engine. The piston comprises a body formed of a metal material, the body includes a lower part joined to an upper part by a weld, the upper part presents a combustion surface and an undercrown surface, and the body includes weld curls along the weld, wherein the weld curls are shaped.

Yet another aspect of the invention provides a method of manufacturing a piston for an internal combustion engine. The method comprises the steps of welding a lower part formed of metal material to an upper part formed of metal material, the welding step including forming weld curls along the weld. The method also includes shaping the weld curls.

BRIEF DESCRIPTION OF THE DRAWINGS

Other advantages of the present invention will be readily appreciated, as the same becomes better understood by reference to the following detailed description when considered in connection with the accompanying drawing wherein.

DETAILED DESCRIPTION OF THE EXAMPLE EMBODIMENTS

Figure 1:
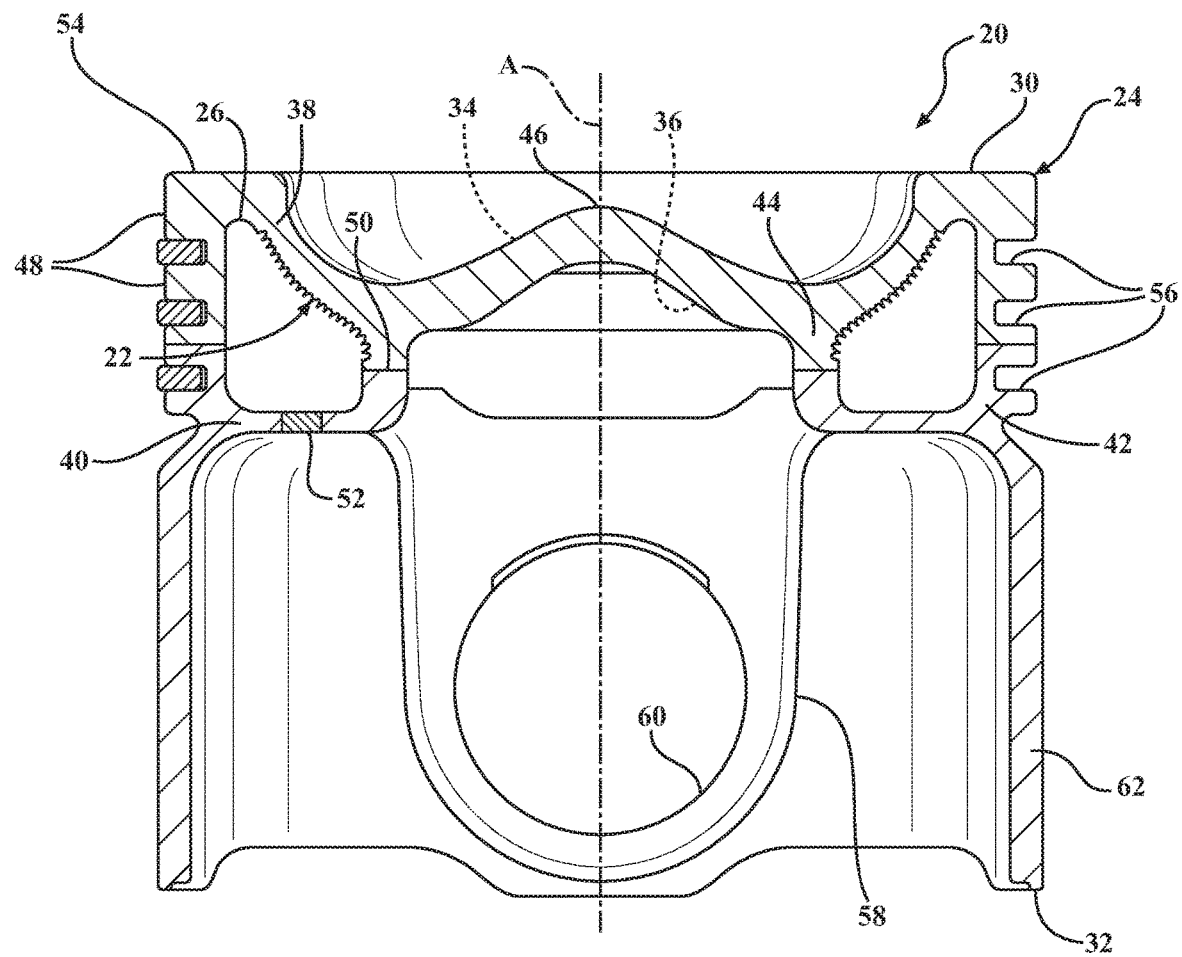
FIG. 1 is a side cross-sectional view of a piston according to one example embodiment with serrations formed in a cooling gallery surface.
Figure 1A:
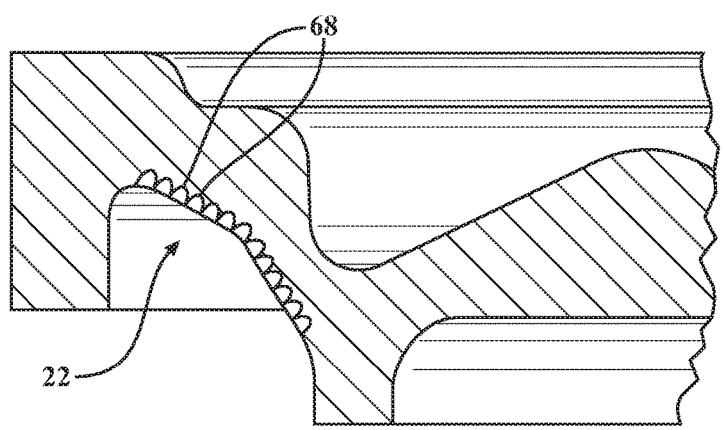
FIG. 1A is an enlarged view of a portion of the piston of FIG. 1.

A piston 20 for an internal combustion engine according to example embodiments is generally shown in FIGS. 1-6. The piston 20 includes serrations 22 formed in a cooling gallery surface 26 and/or an undercrown surface 36 to reduce the temperature of the piston 20, for example in the area of a bowl rim 54 and/or bowl apex 46, which helps to avoid oxidation and erosion, without increasing significantly the temperature of the cooling gallery surface 26 and/or undercrown surface 36. Alternatively, the piston 20 can include excess material or flash, in the form of upper and lower weld curls 28a, 28b, located between the upper and lower parts of the piston 20. The upper and lower weld curls 28a, 28b are intentionally shaped during the process of manufacturing the piston 20 to increase the area of the cooling gallery surface 26 and thus reduce the temperature of the piston 20. The reduced temperature will help to reduce coked oil deposits and oil degradation.

As shown in the Figures, the piston 20 comprises a body formed of a metal material, such as steel, extending circumferentially around a center axis A and longitudinally along the center axis A from an upper end 30 to a lower end 32. The body includes an upper part, such as a crown 24, presenting a combustion surface 34 which is exposed to a combustion chamber during use in the internal combustion engine. The upper part or crown 24 also presents then undercrown surface 36 facing opposite the combustion surface 34.

The crown 24 includes at least a portion of the cooling gallery surface 26, and the cooling gallery surface 26 extends along at least a portion of the crown 24 and surrounds a volume of space which can contain a cooling medium. The body includes an upper wall 38, a lower wall 40, an outer side wall 42, and an inner side wall 44 which together provide the cooling gallery surface 26. In the example embodiment, the upper part provides the upper wall 38, and the lower part provides the lower wall 40. Each part provides a portion of the outer side wall 42 and a portion of the inner side wall 44. This cooling gallery surface 26 extends circumferentially around the center axis A. The volume of space or chamber formed by the cooling gallery surface 26 and the cooling gallery surface 26 surrounds the undercrown surface 36 located at and around the center axis A of the piston 20. The cooling gallery surface 26 is disposed along only a portion of the upper wall 38 of the crown 24 and is spaced radially from the center axis A. The outer side wall 42 and inner side wall 44 are formed by ribs which are joined together to define the volume of space surrounded by the cooling gallery surface 26. In this embodiment, the outer ribs are connected by a weld 50 to form the outer side wall 42, and the inner ribs are connected by a weld 50 to form the inner side wall 44. The ribs could alternatively be attached to one another using another joining method, such as bonding weld or a mechanical attachment.

Figure 2:
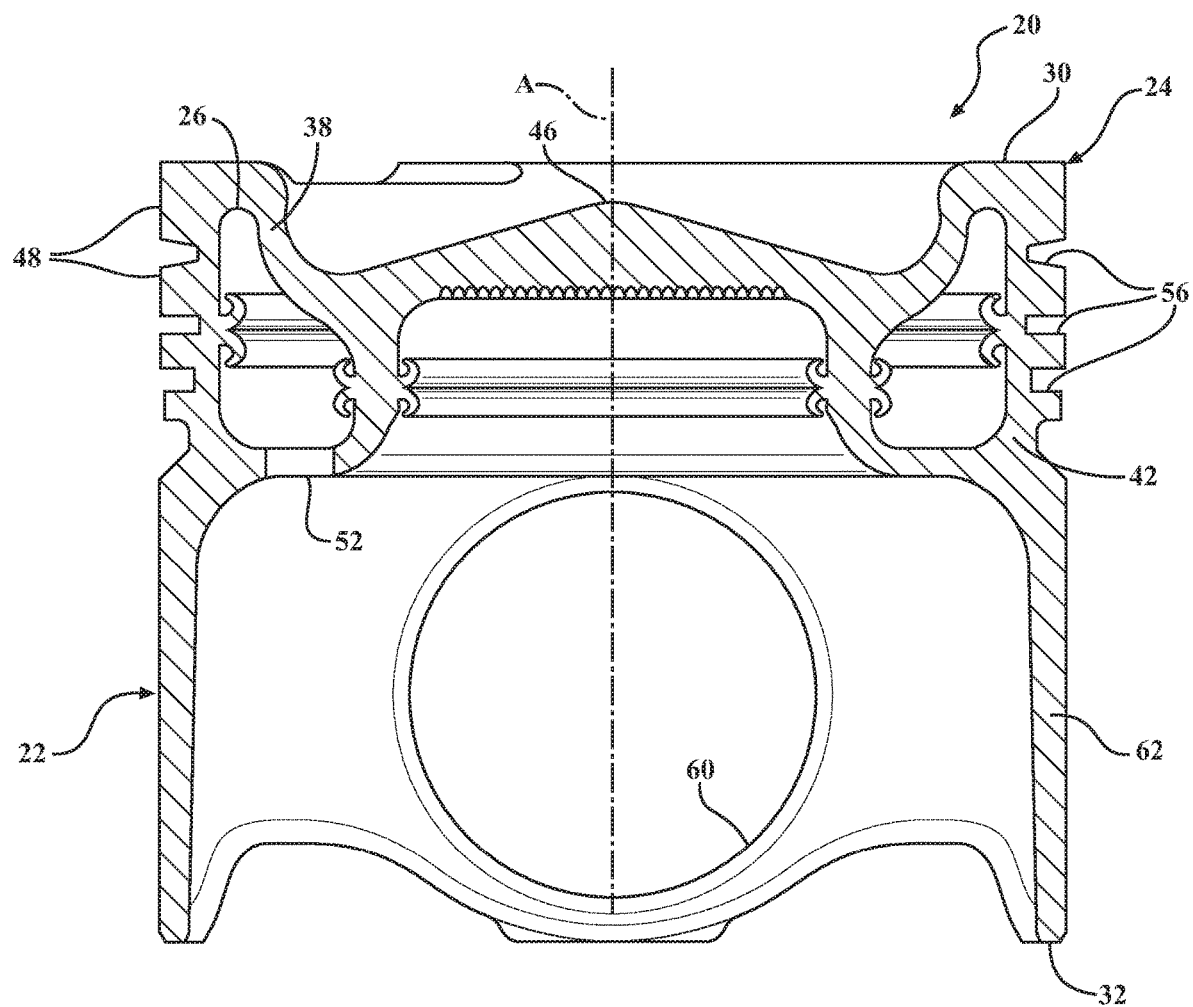
FIG. 2 is a side cross-sectional view of a piston according to another example embodiment with serrations formed in an undercrown surface.
Figure 2A:
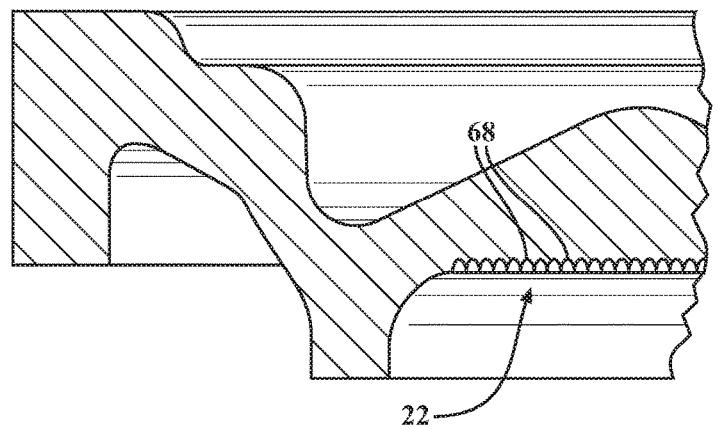
FIG. 2A is an enlarged view of a portion of the piston of FIG. 2.

At least one of the walls 38, 40, 42, 44, and typically the lower wall 40, includes an opening 52 for allowing the cooling media to enter the space surrounded by the cooling gallery surface 26, as shown in FIGS. 1 and 2. In the embodiment of FIG. 1, the opening 52 is sealed, for example by a plug. The opening 52 could alternatively be sealed by disposing an adhesive in the opening 52, welding a material to the opening 52, or brazing the opening 52. In the embodiment of FIG. 1, the cooling media is contained in the sealed cooling gallery during operation of the piston 20. In the embodiment of FIG. 2, there are two or more openings 52, and they are not sealed, but rather remain open so that the cooling media can flow in and out of the cooling gallery. For example, one of the openings 52 can include an inlet hole and an exit hole. According to another alternative, the piston 20 could be cast as a single piece including the volume of space surrounded by the cooling gallery surface 26.

In the piston 20 of the example embodiment, the combustion surface 34 of the body presents an apex 46 at the center axis A, a bowl-shape surrounding the apex 46, and a bowl rim 54 surrounding the bowl-shape. The outer side wall 42 also includes a plurality of ring grooves 56 facing away from the center axis A and extending circumferentially around the center axis A. The ring grooves 56 are spaced from one another by lands 48, and the lands 48 present the outer diameter of the body. The piston 20 of the example embodiment further includes at least one pin boss 58, but typically a pair of pin bosses 58, each depending from one of the ring lands 48 of the crown 24 and extending circumferentially about the center axis A. The at least one pin boss 58 presents a pin bore 60 extending perpendicular to the center axis A for receiving a wrist pin (not shown). The body also includes at least one skirt section 62, but typically a pair of skirt sections 62, depending from the crown 24 and extending circumferentially about the center axis A. The at least one skirt section 62 is joined to the at least one pin boss 58. Typically, the skirt sections 62 are spaced from one another circumferentially about the center axis A by the pin bosses 58. It is noted that the body of the piston 20 could comprise various other designs other than the design disclosed in the Figures, while still including the serrations 22 and/or shaped weld curls 28a, 28b.

In the example embodiment of FIG. 1, the piston 20 includes the serrations 22 along the cooling gallery surface 26, for example a portion of the cooling gallery surface 26 provided by the upper part. In the embodiment of FIG. 26 2, the piston 20 includes the serrations 22 along the undercrown surface 36 located at and around the center axis A of the piston 20. The serrations 22 increase the surface area of the cooling gallery surface 26, combustion surface 34, and/or undercrown surface 36, which can reduce the temperature of the piston 20, for example in at the area of the bowl rim 54, which helps to avoid oxidation and erosion without increasing significantly the cooling gallery surface 26 and/or undercrown surface 36 temperatures.

According to the example embodiment, each serration 22 includes a base surface 68 which is radiused, and thus presents a concave shape. The base surface 68 is typically approximately 1 to 3 mm deep relative to the cooling gallery surface 26 or undercrown surface 36. The serrations 22 can be formed by machining the cooling gallery surface 26 and/or undercrown surface 36, for example prior to joining the upper part to the lower part. Alternatively, the serrations 22 can be formed during a casting process used to form the entire body or a portion of the body of the piston 20.

In addition to or instead of the serrations 22, the piston 20 can include the upper and lower weld curls 28a, 28b which are shaped to increase the surface area of the cooling gallery surface 26, combustion surface 34, and/or undercrown surface 36, as shown in FIGS. 3-6. The weld curls 28a, 28b are excess metal material or flash from the body formed when an upper part of the piston 20 and a lower part of the piston 20 are joined, for example by welding the upper rib to the lower rib to form the inner side wall 44 and the outer side wall 42. The welding step can include inertia welding, friction welding, hybrid induction welding, or another type of welding which causes the excess material to exist around the weld 50 between the upper and lower parts. The excess material is shaped during or after the joining step to provide the shaped weld curls 28a, 28b which increase the surface area.

The weld curls 28a, 28b can be formed on the interior side of the outer side wall 42, the exterior side of the inner side wall 44, and/or the interior side of the inner side wall 44, as shown in FIGS. 3-6. Typically, each of those locations includes the upper weld curl 28a in the upper part and the lower weld curl 28b in the lower part. The surface area provided by the weld curls 28a, 28b can vary, such that the surface area provided by the upper weld curl 28a can be equal to, greater than, or less than the surface area provided by the lower weld curl 28b. In addition, the total surface area provided by the weld curls 28a, 28b can vary in each location mentioned above (the interior side of the outer side wall 42, the exterior side of the inner side wall 44, and/or the interior side of the inner side wall 44). For example, the total surface area of the weld curls located along the interior side of the inner side wall 44 can be greater than the total surface area of the weld curls 28a, 28b located along the exterior side of the inner side wall 44.

Figure 3:
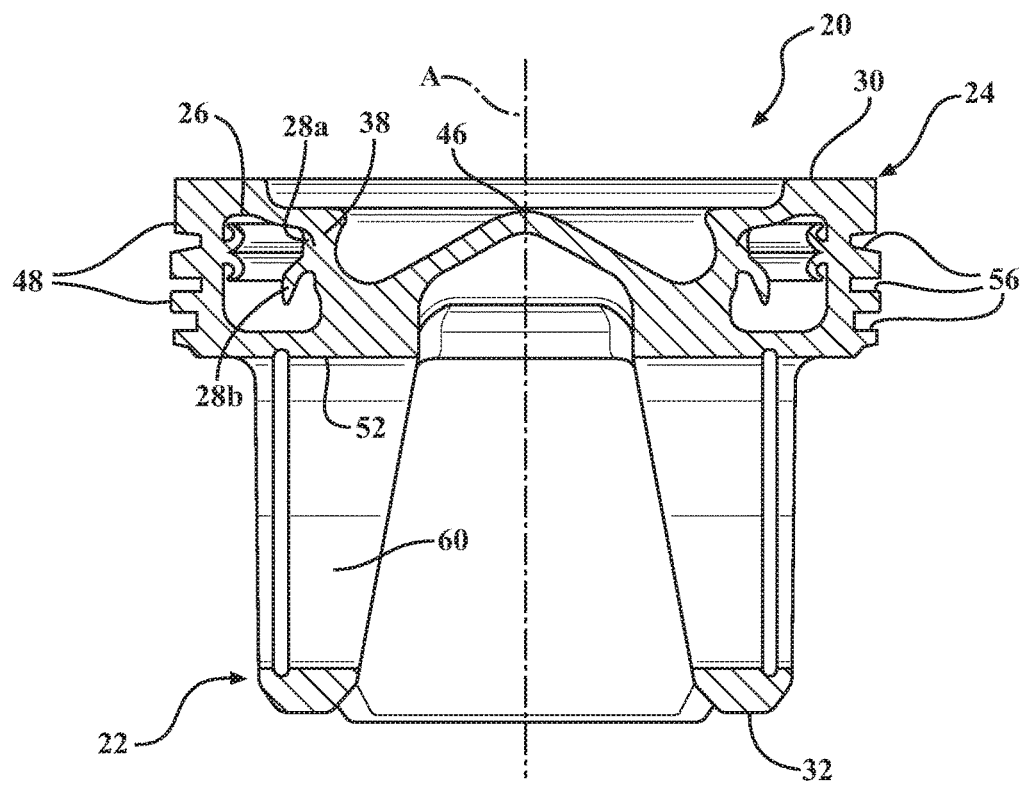
FIGS. 3-6 are side cross-sectional views of pistons according to other example embodiments with shaped weld curls between an upper and lower part.
Figure 4:
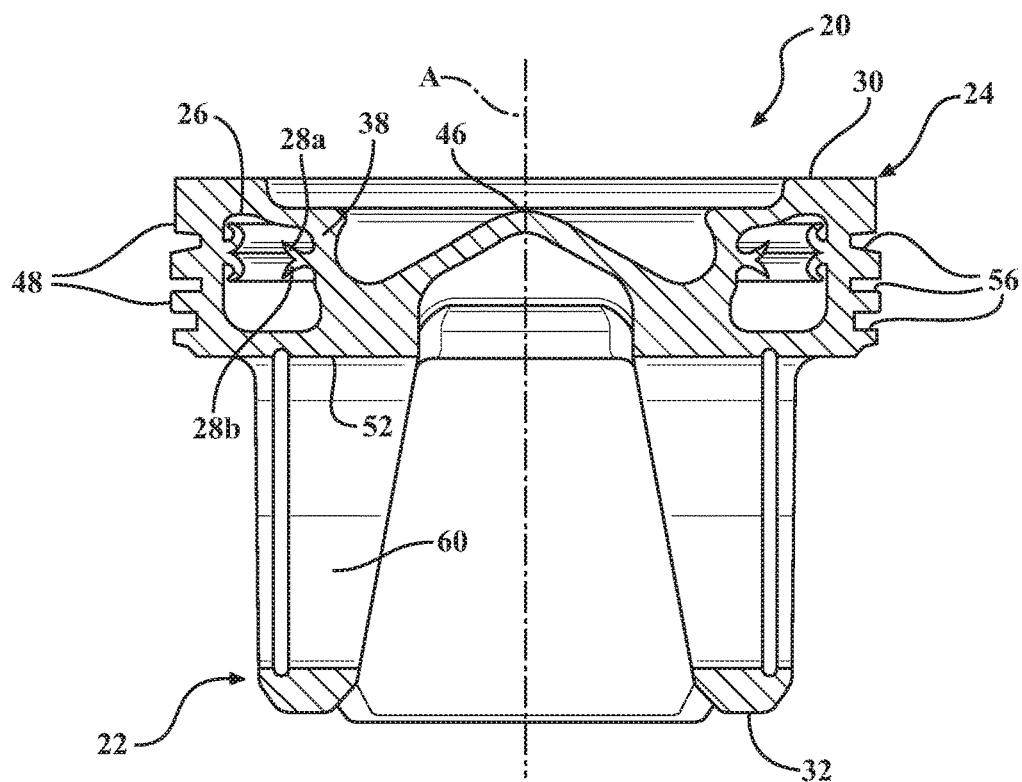
Figure 5:
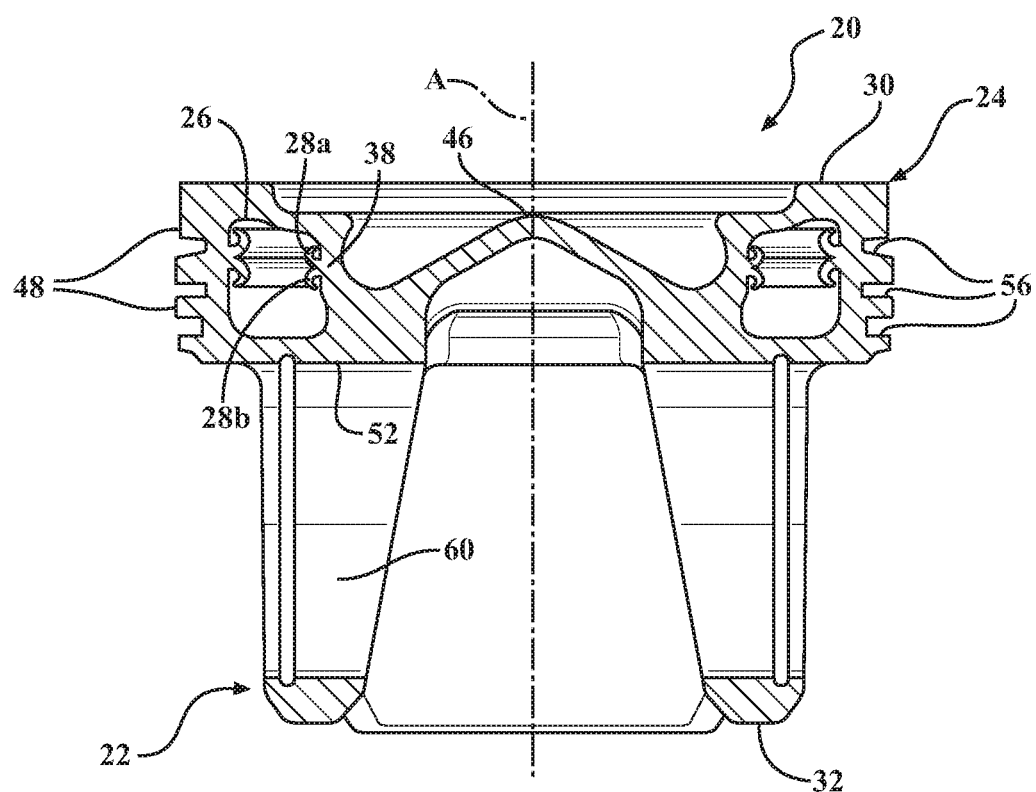
Figure 6:
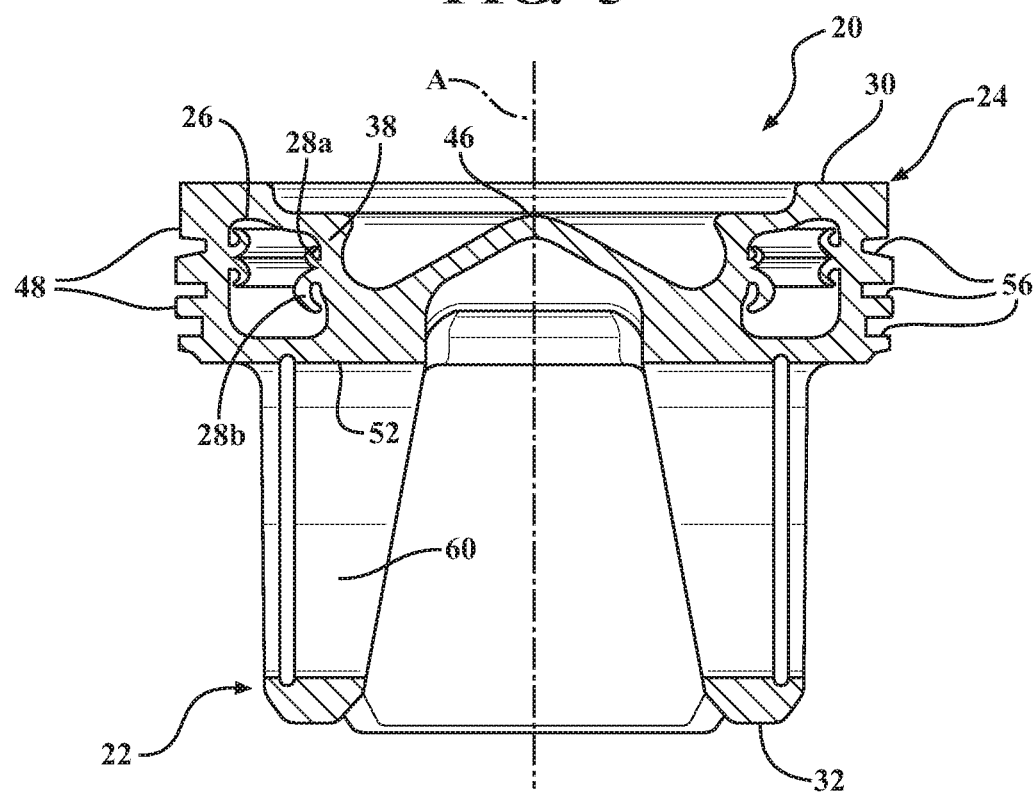

For example, as shown in FIG. 3, the excess material can be shaped such that the surface area of the lower weld curl 28b is greater than the surface area of the upper weld curl 28a on the exterior side of the inner side wall 44. In this case, the weld curls 28a, 28b are formed by friction welding with inertia. In the example of FIG. 4, the weld curls 28a, 28b located along the exterior side of the inner side wall 44 are formed by a direct drive friction welding process to increase the surface area of the weld curls 28a, 28b. In this case, the thrust force is increased in the middle of the friction welding process. In the example of FIG. 5, the weld curls 28a, 28b are formed by a friction welding process with inertia. The weld curls 28a, 28b are formed such that the weld curls 28a, 28b located along the interior side of the outer side wall 42 have a greater surface area than the weld curls 28a, 28b located along the exterior side of the inner side wall 42. In FIG. 6, the weld curls 28a, 28b are formed by friction welding with inertia such that the lower weld curl 28b located on the exterior side of the interior side wall 42 has a greater surface area than the upper weld curl 28a located on the exterior side of the inner side wall 42.

Another aspect of the invention provides a method of manufacturing the piston 20 including the serrations 22 and/or the weld curls 28a, 28b. The method generally includes the steps of providing the body formed of the steel material; and forming the serrations 22 along the cooling gallery surface 26 and/or along the undercrown surface 36. The method can also include forming the shaped weld curls 28a, 28b instead of or in addition to the serrations 22.

The process of forming the serrations 22 can including forming the serrations 22 while casting the body of the piston 20. Alternatively, the serrations 22 can be formed by machining after forming the body of the piston 20.

The process of forming the shaped weld curls 28a, 28b can be done while joining the upper part to the lower part of the piston 20, for example during the welding process. According to one embodiment, the friction welding process includes increasing the thrust force so that a greater thrust force is applied during the friction welding process. The joining process can be modified in other ways to form the shaped weld curls 28a, 28b during the joining step. Alternatively, the weld curls 28a, 28b can be shaped after joining the upper part to the lower part.

Obviously, many modifications and variations of the present invention are possible in light of the above teachings and may be practiced otherwise than as specifically described while within the scope of the following claims. In particular, all features of all claims and of all embodiments can be combined with each other, as long as they do not contradict each other.

The invention claimed is:

1. A piston for an internal combustion engine, comprising:
a body formed of a metal material,
said body presenting a combustion surface and an undercrown surface,
said body including a cooling gallery surface surrounding a volume of space which extends circumferentially around said undercrown surface,
said body including a plurality of serrations formed in said cooling gallery surface and/or said undercrown surface, each serration including a base surface which presents a concave shape, and said base surface being 1 to 3 mm deep relative to said cooling gallery surface and/or said undercrown surface.

2. The piston of claim 1, wherein said body includes an upper part providing a portion of said cooling gallery surface, said body includes a lower part providing a portion of said cooling gallery surface, and said serrations are formed in said portion of said cooling gallery surface provided by said upper part.

3. The piston of claim 1, wherein said serrations are formed in said undercrown surface.

4. The piston of claim 1, wherein said body includes a weld between an upper part joined to a lower part, and said body includes weld curls along said weld.

5. The piston of claim 1, wherein said body includes a lower part joined to an upper part at a weld, and said body includes weld curls located along said weld, and said weld curls are shaped.

6. The piston of claim 1, wherein said body is formed of steel,
said body extends circumferentially around a center axis and longitudinally along said center axis from an upper end to a lower end,
said body includes a weld between an upper part joined to a lower part,
said upper part includes said combustion surface and said undercrown surface facing opposite said combustion surface,
said upper part includes a portion of said cooling gallery surface,
said upper part includes an upper wall, a portion of an outer side wall, and a portion of said inner side wall,
said lower part includes a lower wall, a portion of said outer side wall, and a portion of said inner side wall,
said upper wall, said lower wall, said inner side wall, and said outer side wall together present said cooling gallery surface,
said cooling gallery surface is spaced from said center axis,
said inner and outer side walls include said weld,
said combustion surface presents an apex at said center axis, a bowl-shape surrounding said apex, and a bowl rim surrounding said bowl shape,
said outer side wall includes a plurality of ring grooves facing away from said center axis and extending circumferentially around said center axis,
said ring grooves are spaced from one another by lands,
said body includes pin bosses depending from one of said ring lands,
said pin bosses presents a pin bore extending perpendicular to said center axis,
said body includes skirt sections extending circumferentially about said center axis, and
said skirt sections are joined to said pin bosses and spaced from one another circumferentially about said center axis by said pin bosses.

7. A method of manufacturing a piston for an internal combustion engine, comprising the steps of:
providing a body formed of a metal material, the body including an upper part presenting a combustion surface and an undercrown surface, the body including a cooling gallery surface surrounding a volume of space which extends around the undercrown surface, and forming a plurality of serrations in the cooling gallery surface and/or the undercrown surface, each serration including a base surface which presents a concave shape, and the base surface is 1 to 3 mm deep relative to the cooling gallery surface and/or the undercrown surface.

8. The method of claim 7, wherein said serrations are formed by machining.

9. The method of claim 7, wherein said serrations are formed in the body while casting the body.

10. A piston for an internal combustion engine, comprising:
a body formed of a metal material;
said body including a lower part joined to an upper part by a weld, said an upper part presenting a combustion surface and an undercrown surface;
said body including weld curls along said weld, said weld curls being shaped;
said body including a cooling gallery surface surrounding a volume of space which extends circumferentially around said undercrown surface; and
and said body including a plurality of serrations formed in said cooling gallery surface and/or said undercrown surface.

11. The piston of claim 10, wherein said upper part includes an upper wall, a portion of an outer side wall, and a portion of an inner side wall,
said lower part includes a lower wall, a portion of said outer side wall, and a portion of said inner side wall,
said upper wall, said lower wall, said inner side wall, said outer side wall present said cooling gallery surface,
weld curls are formed on an interior side of said outer side wall, an exterior side of said inner side wall, and/or an interior side of said inner side wall.

12. The piston of claim 10, wherein said weld curls include an upper weld curl in said upper part and a lower weld curl in said lower part.

13. The piston of claim 12, the surface area provided by said upper weld curl is greater than or less than the surface area provided by said lower weld curl.

14. The piston of claim 10, wherein a total surface area of said weld curls along an interior side of an inner side wall is greater than a total surface area of said weld curls along an exterior side of said inner side wall.

15. The piston of claim 10, wherein said body is formed of steel,
said body extends circumferentially around a center axis and longitudinally along said center axis from an upper end to a lower end,
said body includes a cooling gallery surface surrounding a volume of space which extends circumferentially around an undercrown surface,
said upper part includes said undercrown surface facing opposite said combustion surface,
said upper part includes a portion of said cooling gallery surface,
said upper part includes an upper wall, a portion of an outer side wall, and a portion of said inner side wall,
said lower part includes a lower wall, a portion of said outer side wall, and a portion of said inner side wall,
said upper wall, said lower wall, said inner side wall, and said outer side wall together present said cooling gallery surface,
said cooling gallery surface is spaced from said center axis,
said inner and outer side walls include said weld,
said combustion surface presents an apex at said center axis, a bowl-shape surrounding said apex, and a bowl rim surrounding said bowl shape,
said outer side wall includes a plurality of ring grooves facing away from said center axis and extending circumferentially around said center axis,
said ring grooves are spaced from one another by lands,
said body includes pin bosses depending from one of said ring lands,
said pin bosses presents a pin bore extending perpendicular to said center axis,
said body includes skirt sections extending circumferentially about said center axis, and
said skirt sections are joined to said pin bosses and spaced from one another circumferentially about said center axis by said pin bosses.

16. A method of manufacturing a piston for an internal combustion engine, comprising the steps of:
welding a lower part formed of metal material to an upper part formed of metal material,
the welding step including forming weld curls along the weld, and
shaping the weld curls.

17. The method of claim 16, wherein the shaping step occurs during the welding step.

18. The method of claim 16, wherein the welding step includes friction welding.

19. The method of claim 18, wherein a thrust force applied to said upper part and/or said lower part is adjusted during said welding step.

\* \* \* \* \*